Dec. 8, 1959 J. B. PARSONS 2,916,005
COMBINED RUDDER AND REVERSE CONTROL FOR MARINE CRAFT
Filed April 9, 1956 4 Sheets-Sheet 1
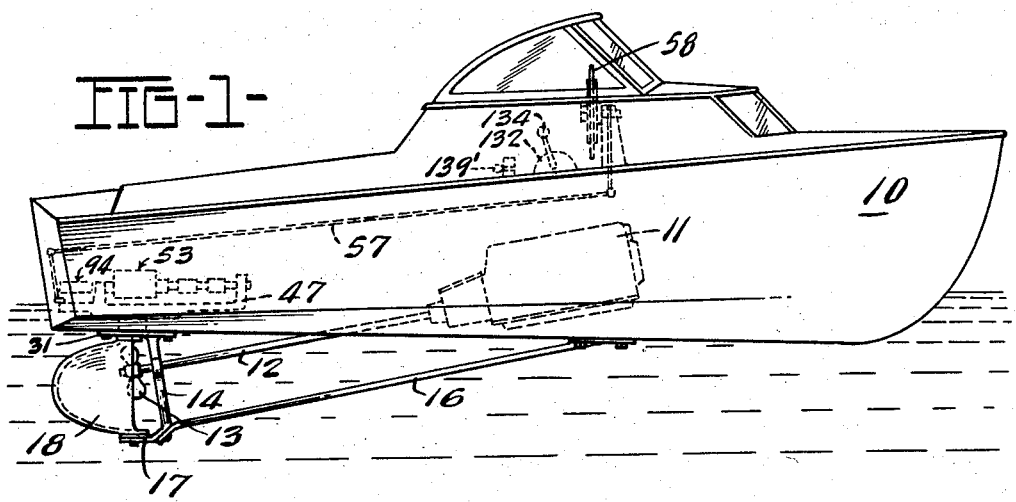
FIG-1-
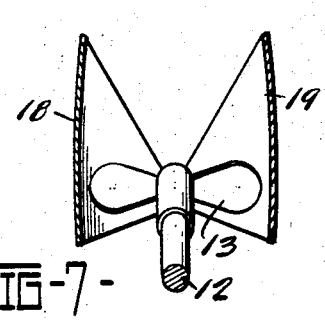
FIG-7-
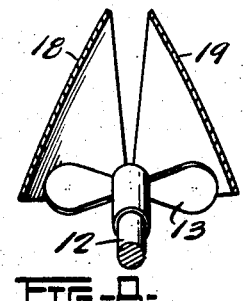
FIG-8-
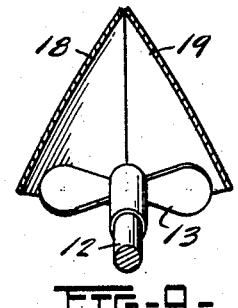
FIG-9-
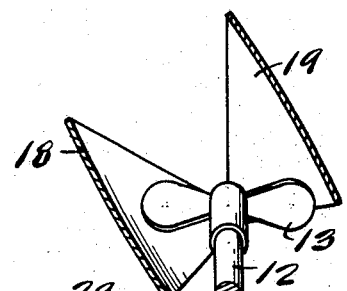
FIG-10-
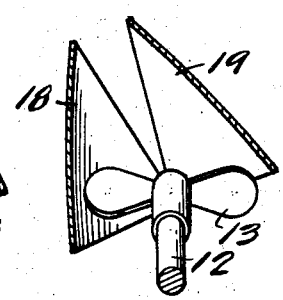
FIG-11-
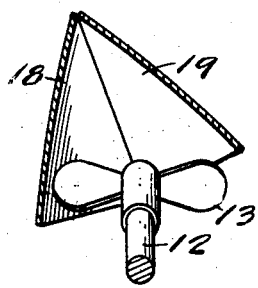
FIG-12-
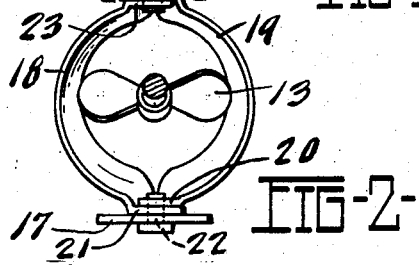
FIG-2-
INVENTOR:
JOHN B. PARSONS.
BY
ATTORNEY.

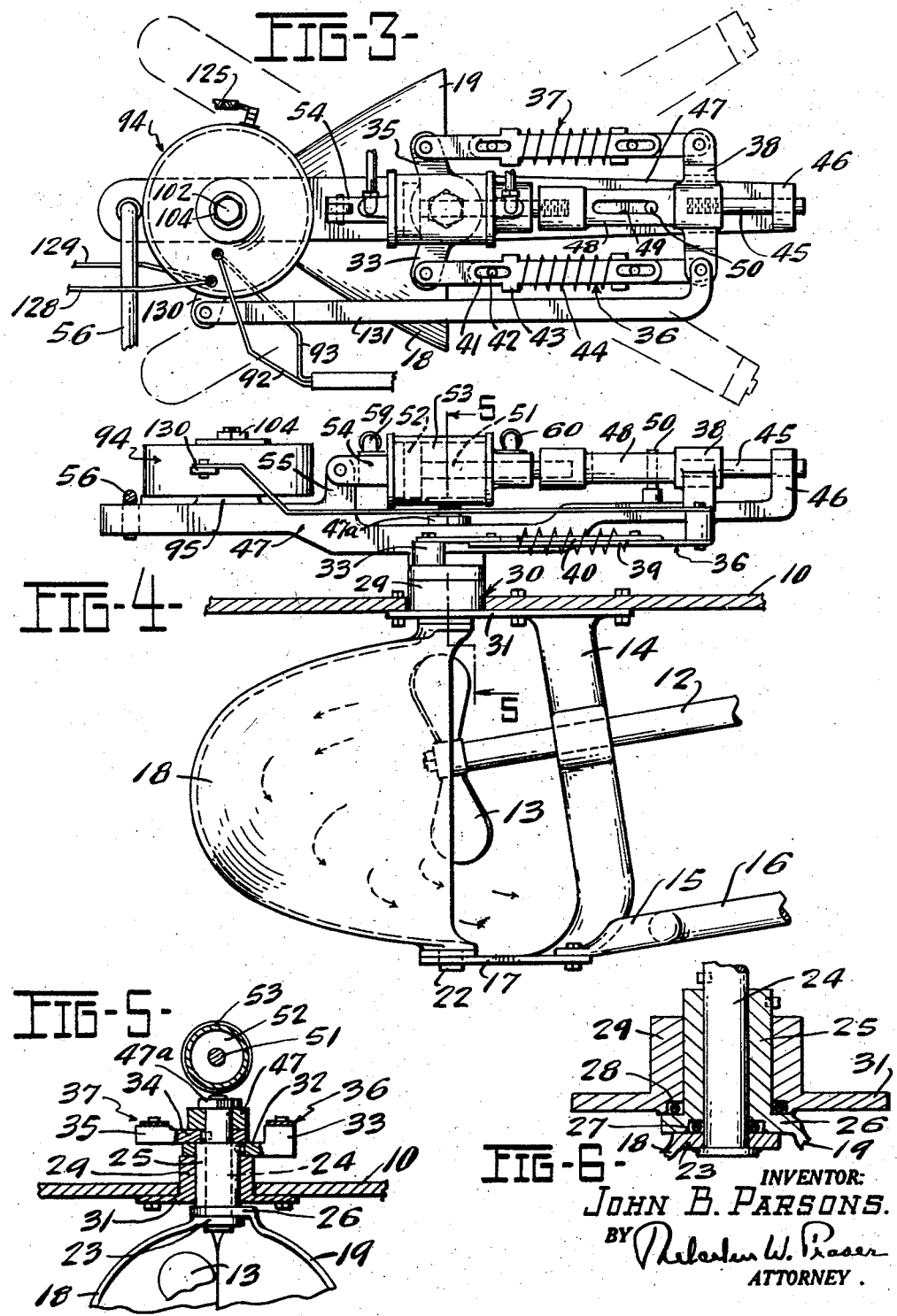

Dec. 8, 1959     J. B. PARSONS     2,916,005
COMBINED RUDDER AND REVERSE CONTROL FOR MARINE CRAFT
Filed April 9, 1956     4 Sheets-Sheet 3
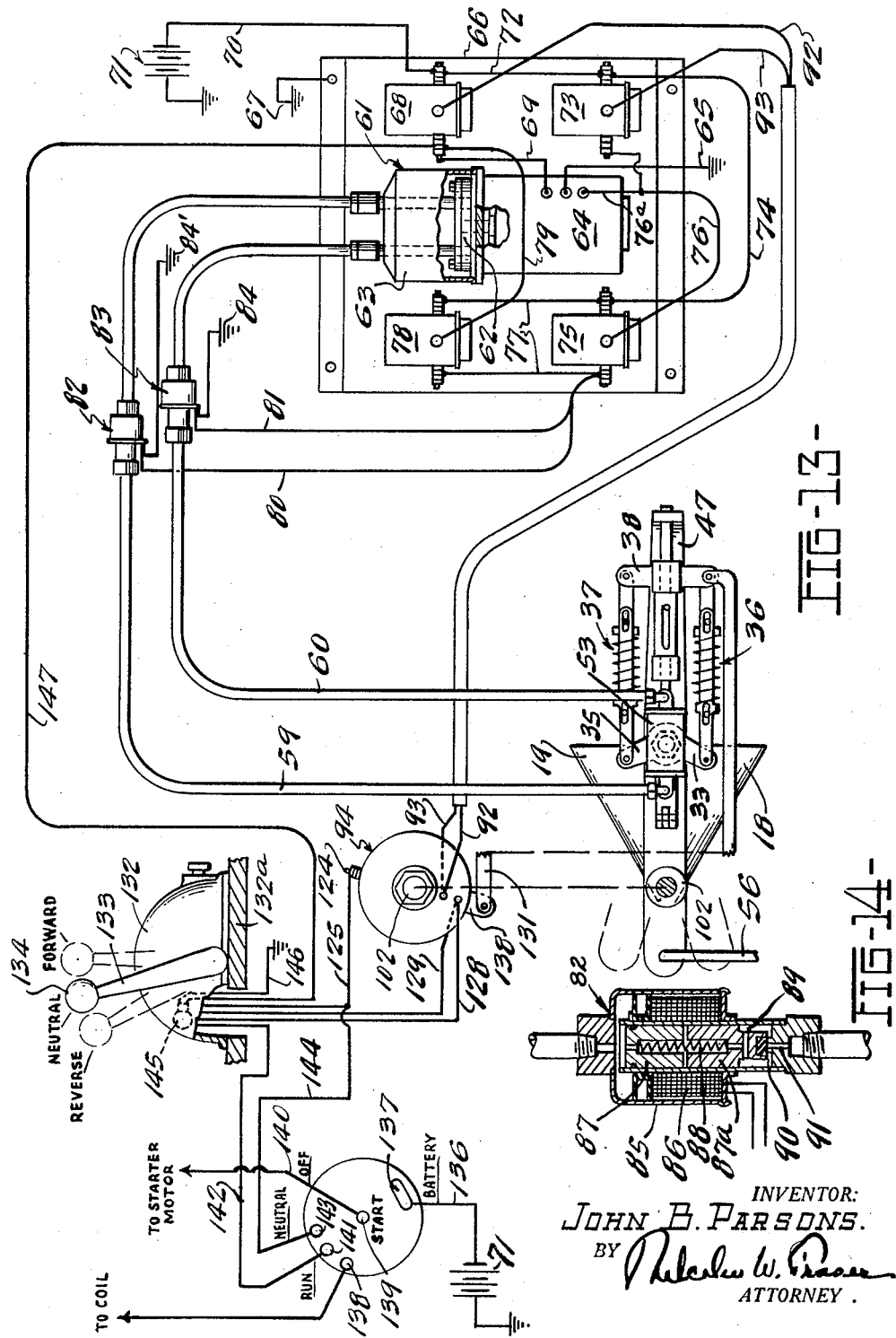
INVENTOR:
JOHN B. PARSONS.
BY
ATTORNEY.

Dec. 8, 1959 J. B. PARSONS 2,916,005
COMBINED RUDDER AND REVERSE CONTROL FOR MARINE CRAFT
Filed April 9, 1956 4 Sheets-Sheet 4
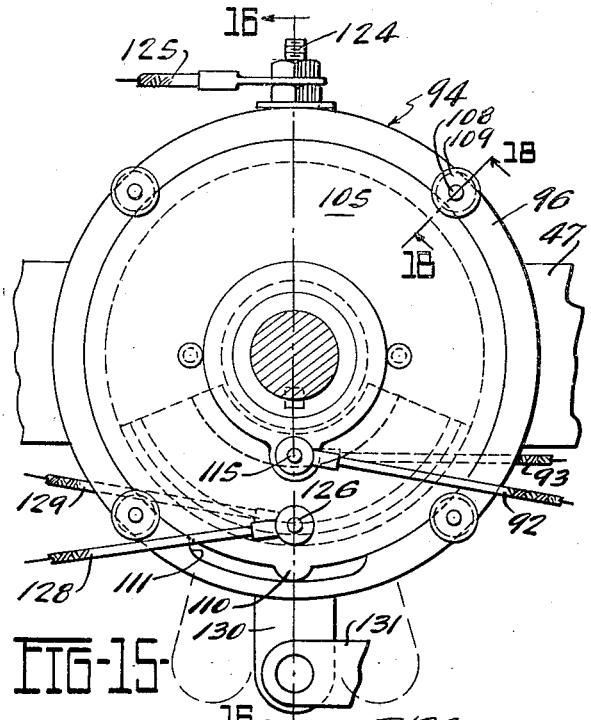
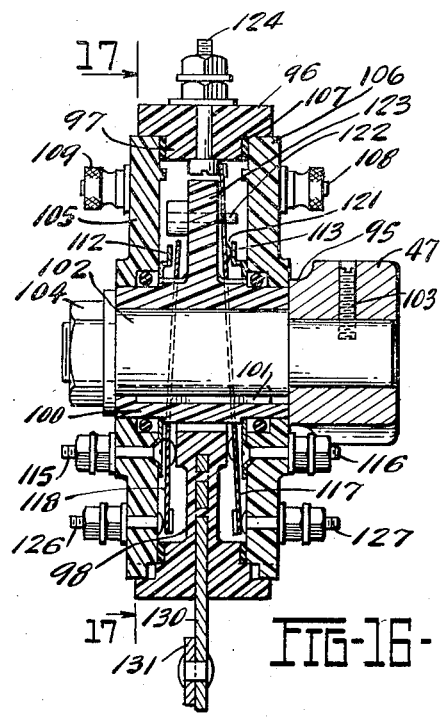
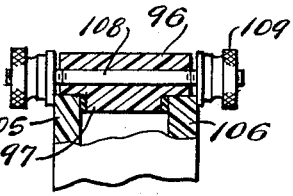
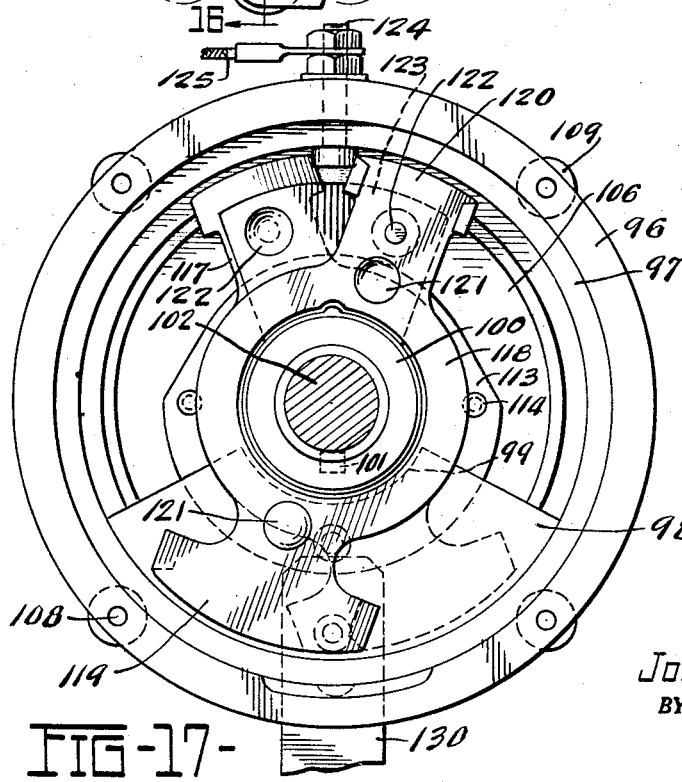
INVENTOR:
JOHN B. PARSONS.
BY
ATTORNEY.

United States Patent Office 2,916,005
Patented Dec. 8, 1959

2,916,005

COMBINED RUDDER AND REVERSE CONTROL FOR MARINE CRAFT

John B. Parsons, Maumee, Ohio

Application April 9, 1956, Serial No. 577,091

5 Claims. (Cl. 114—145)

This invention relates to the steering and direction control of power operated marine craft and an object is to produce a combined rudder and direction control device which can be operated not only to control the steering but also the forward, and reverse movement of the craft as well as the neutral position thereof without altering the propeller drive.

Another object is to produce mechanism of the above character which can be actuated and controlled at a remote station enabling the helmsman, for example, to steer and control the forward, and reverse craft movement as well as the neutral position thereof by the simple manipulation of an operating device.

A further object is to produce a simple and efficient hydraulic mechanism for effecting actuation of the rudder parts to place the craft in forward or rearward running position or in neutral position without varying the pitch or operation of the propeller.

A still further object is to produce an assembly embodying the rudder and reverse control mechanism, which can be readily and conveniently installed on the boat in position of use.

A still further object is to improve rudder structures of the clam shell type to enhance the operation thereof, particularly in the position for causing reverse or rearward movement of the craft.

A still further object is to produce a system of the above character which insures that upon the starting of the engine, the rudder components are in neutral position regardless of their position at the time the engine was stopped.

Other objects and advantages will hereinafter appear and for purposes of illustration but not of limitation, an embodiment of the invention is shown on the accompanying drawings in which Figure 1 is a side elevation of an inboard motor boat equipped with a combined rudder and direction control device and indicating the operating mechanism for same;

Figure 2 is a sectional view through the propeller drive shaft showing the propeller and the clam shell type rudder and direction control device;

Figure 3 is a top plan view of a portion of the operating mechanism for actuating the clam shell members to effect steering of the craft and also for controlling the direction of movement of the craft;

Figure 4 is a side elevation of the mechanism shown in Figure 3, some parts in section and also showing the relation of the propeller and associated parts;

Figure 5 is a fragmentary vertical sectional elevation on the line 5—5 of Figure 4;

Figure 6 is an enlarged sectional view of the parts which are actuated for effecting opening and closing movements to the clam shell members;

Figures 7 to 12 are somewhat diagrammatic sectional views showing the various positions of the combined rudder and direction control device;

Figure 13 is a diagrammatic view of the electrical wiring and operating units for effecting the actuation of the rudder-direction control parts;

Figure 14 is an enlarged longitudinal sectional view of the solenoid operated valve disposed in each of the tubes leading from the motor-pump unit to the operating cylinder;

Figure 15 is a sectional view taken through the supporting post for the circuit position selector and viewing the latter in elevation;

Figure 16 is a verical sectional view of the circuit selector on the line 16—16 of Figure 15;

Figure 17 is a vertical sectional view on the line 17—17 of Figure 16 on an enlarged scale and with one of the adjuster plates removed; and Figure 18 is an enlarged fragmentary sectional view on the line 18—18 of Figure 15.

The illustrated embodiment of the invention comprises a motor boat 10 equipped with an inboard engine 11 which has a rearwardly extending downwardly inclined drive shaft 12, on the end of which is mounted a propeller 13 arranged in the usual manner beneath the stern of the craft. As shown, there is a depending bracket arm 14 in which the shaft 12 has bearing and the lower end of the bracket arm is forked. For affording rigidity to the bracket arm an upwardly and forwardly inclined brace rod 16 is secured at its front end to the bottom of the boat and at its rearward end to a rearwardly extending platform 17 integral with the bracket 14.

Mounted for pivotal movements on a vertical axis is a combination rudder and direction control device consisting of a pair of substantially equal clam shell sections 18 and 19, each section being arcuately contoured so that when the two sections are brought into abutting relation, they form a hemisphere, the front end of which is open. Into that end portion slightly projects the propeller 13 as indicated generally on Figure 4. It should be noted that the upper edge of the propeller is spaced a short distance from the upper portion of the clam shells but the lower end of the propeller is spaced a considerable distance from the lower end of the clam shells. The purpose of this arrangement will be described hereinafter.

As indicated on Figure 2, an inwardly extending flange bearing disc 20 is formed on the lower end of the clam shell section 19 and this flange disc bears upon a flange disc 21 which is integral with and extends inwardly from the lower end of the clam shell section 18, the disc 21 bearing upon the upper surface of the rearwardly extending platform 17. Extending through the platform 17 and providing bearings for the discs 20 and 21 is a bearing stud 22.

On the upper end of the clam shell section 18 and extending in parallel relation to the discs 20 and 21 is a bearing disc flange 23 to which is fixed a vertical post 24 so that the post 24 and the clam shell 18 turn together, thereby enabling actuation of the clam shell section 18 by oscillating movements of the post 24. Surrounding the post 24 and bearing thereon is an elongate vertical sleeve 25 which has integral at its lower end a bearing disc 26 which engages and rotates relatively to the bearing disc 23. Suitable sealing rings 27 and 28 are interposed respectively between the bearing disc 26 and the post 24 and bearing disc 23, and between the bearing disc 26 and a rigid outer vertically disposed bearing sleeve 29 within which the sleeve 25 bears. The sleeve 29 as shown in Figure 6 is integral with a mounting plate 31 which is bolted to the underside of the hull 10, as shown in Figure 4. It will be observed that the bracket arm 14 is rigid with the plate 31 thereby enabling these parts to be assembled as a unit to the hull of the craft.

Bearing on the upper end of the sleeve 29 and oscillatable thereon is a ring 32 which embraces the rockable sleeve 25 and is keyed thereto so that oscillating movements of the ring 32 are imparted to the vertical sleeve 25 and thence to the clam shell member 19. An arm 33 is integral with the ring 32 and extends laterally therefrom and terminates in an upwardly projecting end portion which is disposed at substantially right angles to the arm 33. On the upper end portion of the post 24 is a ring 34 which is keyed thereto so that oscillating movements of the ring are imparted to the post and thence to the clam shell member 18. Extending laterally in a direction opposite to that of the arm 33 is an integral arm 35 the outer end of which is substantially aligned horizontally with the upward extending end portion of the arm 33, substantially as shown on Figure 5. Pivoted to the upwardly extending end portion of the arm 33 and extending forwardly thereof is a link assembly 36 and a similar link assembly 37 is pivoted to the outer end of the arm 35 and projects forwardly thereof. The front ends of the links 36 and 37 are pivotally connected to the opposite end portions of a transversely disposed yoke-like cross head 38.

The link assemblies 36 and 37 are identical in construction so that a description of one will suffice. It will be understood that these afford certain lost motion of a yielding or resilient nature so that in the event that the clam shells upon being actuated to their closed position encounter an object, or in the event of overrunning of the parts, damage to the mechanism will not result which manifestly would be the case in the event of a rigid link connection. As shown, each link assembly comprises a pair of flat superposed links 39 and 40, the upper link 40 having elongate slots 41 at opposite end portions to receive pins 42 projecting upwardly from the link 39. At opposite ends of each of the links are T projections 43 and between these projections is disposed a coiled spring 44. Thus upon rocking of the arm 33 and 35 in one direction or the other the coil springs may be compressed in the event that a force in excess of a predetermined maximum is encountered.

Screwthreaded into the front end of the cross head 38 and extending forwardly is a guide pin 45 which extends slidably through a hole formed in an upright bracket end portion 46 which is integral with a horizontally disposed supporting frame bar 47. The frame bar 47 supports a piston and cylinder assembly and a circuit selector as will hereinafter appear, and is mounted midway of its length for rocking movements in a horizontal plane on the post 24 and a nut 47a securing the frame bar in position. The arrangement is such that the frame bar 47 can be oscillated or rocked to effect conjoint rocking movements to the two clam shell members 18 and 19 so that the latter serve as a rudder for steering the boat.

Disposed forwardly of the post 24 is a cross head extension 48 which is integral with the cross head 38 and extends rearwardly thereof. A longitudinally elongate slot 49 in the extension 48 receives a pin 50 which is rigid with and projects upwardly from the frame bar 47, thereby to guide the to and fro movements of the cross head and its extension. Screwthreaded into the rear end of the cross head extension 48 is a piston rod 51 which has at its rear end a piston 52 reciprocable within a cylinder 53. The cylinder is secured to the frame bar 47 by a rearwardly extending rigid arm 54 which has a yoke-like end straddling a post 55 which is integral with and extends upwardly from the frame bar 47. A pin provides a connection between these parts, thereby enabling vertical rocking movements of the cylinder with respect to the frame bar.

As above mentioned, the frame bar can be rocked horizontally in one direction or the other to effect a rudder-like action to the clam shell members 18 and 19 causing the latter to be swung simultaneously in one direction or the other. Such rocking movement is effected by a steering link 56 which is connected to the rear end of the frame bar 47 and, as generally indicated on Figure I, a suitable operative connection 57 extends from the link 56 to a helm 58, the turning of which causes the frame arm 47 to be swung in one direction or the other, thereby to swing the clam shell members 18 and 19 as a unit to the desired position for steering the craft.

Additionally the clam shell members can be actuated to positions which control the forward and rearward movements of the craft as well as to dispose the craft in a neutral position so that with the rotating propeller will drive the craft neither forwardly nor rearwardly. When the clam shell members 18 and 19 are in the position shown in Figure 7 where they are spread fully apart, the operation of the propeller is substantially unimpeded, and the craft is driven forwardly in the usual manner, the wash from the propeller travelling in a relatively free manner through and between the clam shell members. By actuating the clam shell members to their closed position in which they abut each other as indicated on Figure 9, the craft is then driven rearwardly, the propeller forcing the water to travel rearwardly and thence downwardly and forwardly. In this connection reference is made to Figure 4 where the arrows show the direction of the stream of water. By arranging the propeller above the center of the clam shell assembly a reverse action is given to the stream of water which imparts the rearward or reverse movement to the craft. In the event that it is desired to retain the craft stationary with the propeller operating, the clam shells are moved to a position substantially as shown in Figure 8 where the clam shells are spaced from each other sufficient to equalize the forward as well as rearward thrust created by the propeller. Thus by opening and closing the clam shell members the selected directional movement of the craft is determined.

An important feature resides in the fact that steering can be effected whether the craft is moving forwardly or rearwardly. For example Figure 10 illustrates the manner of steering the craft when the clam shell members 18 and 19 are disposed in the forward running position. On the other hand, Figure 12 indicates the rudder-like action of the clam shells when a reverse movement is imparted to the craft. The clam shell members can also be conjointly rocked in a lateral direction when they are adjusted to the neutral position, as indicated in Figure 11.

The opening and closing of the clam shell members 18 and 19 is effected hydraulically by the shifting movement of the piston 52. By forcing the piston 52 forwardly in its cylinder 53, opening movement is imparted to the clam shell members to the extent desired. By forcing the piston 52 rearwardly in its cylinder, the clam shell members 18 and 19 are moved toward each other to the desired extent. As above mentioned, the link assemblies 36 and 37 are such that in the event of over-running or overtravel, the springs take up the movement and militate against damage to the parts.

For driving the piston 52, a tube 59 leads from the rear end of the cylinder 53 and a tube 60 leads from the front end of the cylinder 53. The tubes 59 and 60 extend to a reversible electric motor-hydraulic pump assembly 61. In this assembly is a suitable hydraulic pump 62 disposed within a liquid reservoir 63, the pump is operatively connected to a reversible electric motor 64. Rotation of the motor in one direction forces liquid under pressure through one of the tubes 59 and 60 and withdraws liquid through the other of these tubes. Manifestly by reversing the direction of the rotation of the motor, the reverse operation takes place so that in this manner the piston may be moved towards one end or the other of the cylinder 53 as desired.

The electric motor is grounded as indicated at 65 and the assembly is carried by a supporting panel 66 for convenience of installation, the panel being suitably grounded at 67. Carried by the panel are a series of relays, a relay 68 being connected to the motor 64 by a lead 69 and to a battery 71 by a lead 70. A buss bar 72 connects the relay 68 with a relay 73 which in turn is connected to the motor by a lead 76a. A lead 74 connects the relay 73 to a third relay 75, the latter being connected to the electric motor 64 and relay 73 by a lead 76. Buss bars 77 connect the relay 75 to a relay 78 which has a lead 79 extending to the relay 68. Extending from the relay 75 are leads 80 and 81 extending to solenoid control valve assemblies 82 and 83 respectively. The solenoid valve assembly 82 is interposed in the tube 59 leading from the cylinder 53 to the motor pump assembly 61 and the solenoid control valve 83 is interposed in the tube line 60. The assembly 82 is grounded as indicated at 84' and the assembly 83 is grounded as indicated at 84.

These solenoid valve assemblies are identical in structure and, as shown in Figure 14, each comprises a housing 85 containing a coil 86 in the center of which is disposed a two part iron core 87 and 87a. Arranged in the hollow cavity of the core parts is a coil spring 88 which normally urges the parts away from each other. The core part 87 is apertured so as to be in communication with the portion of the tube line leading from the hydraulic pump 62 so that liquid can be forced through the core units by entering the small opening in the end portion of the core part 87. There is a port in the outer end of the core part 87a which communicates with a transverse passage 89 enabling liquid to pass therethrough and around the end of the valve extension 90 which projects beyond the passage 89, there being a sealing gasket at the end of the extension 90 to close off the passage 91 which leads to the other portion of the tube extending to the piston cylinder 53.

The arrangement is such that when the electric motor 64 is energized, both the solenoid valve assemblies 82 and 83 are likewise energized to cause the core parts 87a to move from their valve seats and allow the liquid to pass one way or the other through the units. As soon as the assembly is deenergized the spring automatically closes the valve. The solenoid valve assemblies 82 and 83 not only trap the liquid in the piston cylinder 53 and thereby retain the piston in its position of adjustment, but also in case of expansion of the liquid within the cylinder 53, the solenoid valves unseat to relieve the pressure and prevent damage to the parts. Thus the strength of the coil spring 88 in the solenoid valve assemblies is selected to withstand a predetermined pressure but is such that it will yield in the event that the pressure exceeds a predetermined maximum, enabling the oil to flow into the reservoir 63.

For energizing the relay 68 a lead 92 extends to a circuit selector 94. Similarly a lead 93 connects the relay 73 to the circuit selector. As will hereinafter appear, current is controlled by the circuit selector 94 to energize the selected relay to cause the electric motor 64 to rotate in one direction or the other to shift the piston 52 in the cylinder 53 in the desired direction, thus to control the opening and closing movements of the clam shell members 18 and 19.

As shown on Figures 4 and 16, the circuit selector 94 is mounted on a boss 95 rising from the top of the frame bar 47 adjacent one end thereof. The specific mounting is hereinafter described. Referring particularly to Figures 15 to 18, the circuit selector comprises a cylindrical housing 96 which has an internal inwardly extending annular wall 97. At one end the wall 97 has an integral sector shaped web 98 which has a curved inner end, indicated at 99. The arcuate surface 99 generally conforms to the curvature of a stationary sleeve 100 which is secured by a key 101 to a shouldered post 102, the lower end of which extends into a hole in the boss 95 and the frame bar 47. A set screw 103 holds the post 102 stationary and a nut and washer assembly 104 may be tightened on the opposite end of the post to hold the assembly in position.

On opposite sides of the cylindrical housing 96 and telescoping therewith are adjuster plates 105 and 106 which bear against washers 107 to effect a seal between the plates and the housing wall 97. The plates are retained in place by attaching studs 108 which are molded within the plastic housing, knurled thumb nuts 109 engaging the studs and holding the parts in position. As shown in Figure 18, the nuts 109 overlap the adjuster plates for attaching purposes.

In order to afford a limited rotary adjustment of the adjuster plates 105 and 106 with respect to the cylindrical housing, a tab 110 is formed on each of the plates and projects into an elongate groove 111 in the housing. In this manner the adjuster plates may be rotatively adjusted with respect to the housing for the purpose of properly positioning the electrical contact elements as will hereinafter appear.

On the inside of the adjuster plate 105 is a dished brass contact ring 112, a similar ring 113 being on the inside of the adjuster plate 106. Rivets 114 secure these rings to their respective plates and engaging the contact ring 112 is a binding post 115 to which the lead 92 from the relay 68 is attached. Similarly a binding post 116 engages the contact ring 113, the lead 93 from the relay 73 being attached to this binding post. Manifestly, the current passing through one or the other of the leads 92 and 93 energizes the selected relay or relays so that the current from the battery 71 will drive the electric motor 64 in the desired direction of rotation, as well as concomitantly energizing the solenoid valves 82 and 83.

A pair of contact spring plates 117 and 118 are arranged for contact with the contact rings 112 and 113 respectively. Each of the spring plates 117 and 118 have T-shaped extensions 119 at the lower end and smaller T-shaped extensions 120 at the upper end, as seen in Fig. 17. On each of the spring plates 117 and 118 are upper and lower integral depressions or buttons 121, the lower button extending inwardly and the upper button extending outwardly and the latter being adapted to engage the peripheral portion of the adjacent contact ring 112 or 113 for delivering that current thereto at the proper time.

In the upper T-shaped arm of each of the spring plates 117 and 118 is a pin 122 which is carried by and projects laterally from a stationary sector member 123 integral with and extending radially from the sleeve 100, the latter being keyed to the stationary post 102.

At the upper end of the housing is a terminal 124 which has a head on its inner end disposed for engagement by one or the other of the smaller T-shaped heads of the spring plates 117 and 118. It will be noted particularly in Figure 17 that the plates 117 and 118 are arranged crosswise relative to each other so that one or the other of the T-shaped heads engages the terminal 124. The small T-shaped heads on the spring plates are arcuate longitudinally so that the terminal 124 will glide over and in contact with these heads as the housing is shifted in one direction or the other thus to enable current to pass from the terminal 124 to one or the other of the spring contact plates 117 and 118 thereby delivering current to one or the other of the contact rings 112 and 113. Connected to the terminal 124 is a lead 125, which will be hereinafter referred to.

Carried by the adjuster plate 105 in a position below the terminal 115 is a terminal 126 which has a head on the inner side of the adjuster plate for engagement by the spring plate 118. Similarly on the adjuster plate 106 and below the terminal 116 is a terminal 127, the head of which disposed on the inside of the adjuster plate is engageable by the spring plate 117. Connected to the terminal 126 is a lead 128 and connected to the terminal 127 is a lead 129. The leads 128 and 129 as well as the lead 125 extend to a manually operated position selector, hereinafter described.

It will be understood that the circuit selector is formed of non-conductive plastic materials, the only electrical conductive materials being the contact rings 112, 113 and spring contact plates 117 and 118 and of course the various terminals. In operation the sleeve 100 and its integral sector 123 are held stationary and thus the spring contact plates 117 and 118 are held stationary. The remainder of the unit including the cylindrical housing 96 and the adjuster plates 105 and 106 together with the contact rings 112 and 113 can be oscillated between relatively narrow limits. For this purpose, an arm 130 may be molded in the cylindrical housing 96 and depends therefrom. Pivoted to the lower end of the arm 130 is a link 131 which, as shown on Figure 3, extends forwardly and has a curved end pivoted to the cross head 38. As the cross head is advanced or retracted responsive to movement of the piston 52, the housing 96 of the circuit selector 94 is rocked in one direction or the other thereby establishing the desired circuit for energizing the solenoid valves 82 and 83 and for causing the electric motor 64 to rotate in one direction or the other, depending upon the desired direction of piston movement and also to de-energize the motor at the proper time.

It is desired that the clam shells 18 and 19 be in their neutral position (spread apart as indicated on Figure 8) when the engine 11 is started. Thus the piston 52 should initially be somewhat forward or at such position where the clam shell members are actuated to their partially open position. Thus in the starting of the engine, current passes directly to the circuit selector 94 from a control switch mechanism to which current passes from the battery 71 through a lead 136 to a terminal 137. The control switch mechanism may be key operated (as by a key 139' in Figure 1) between "off," "engine starting-neutral," and "run" positions. When the switch is turned from the "off" position to the "start" position, the contact 137 is immediately connected electrically with an engine coil contact 138 and a contact 143 which is the neutral contact. The contact 143 is connected to a lead 144 which is a branch lead connected to the lead 125, thus passing live current to the terminal 124 of the circuit selector.

If the clam shells have been left in their neutral position, such as shown in Figure 8, then no action would take place so far as the electric motor 64 is concerned. However, if on the other hand, the clam shell members 18 and 19 were left in their reverse position, as indicated on Figure 9, or in the forward position as indicated on Figure 7, then one or the other of the contact spring plates 117 and 118 would be in engagement with the head of the terminal 124, thus delivering current to either the relay 68 or 73 causing the electric motor to be driven in the desired direction for actuating the piston 52 to the proper position at which the clam shells would be arranged in their neutral position, as indicated on Figure 8.

Reference is hereby made to my copending application, Serial No. 547,487 filed November 17, 1955 and entitled "Reverse Gear Operating System for Marine Engines" wherein detail description and illustration of the switch mechanism as well as the position selector is set forth. Since the specific structures of these mechanisms forms no part of the present invention, more complete description and illustration are not considered necessary here. Suffice it to say that in order to energize the engine starter mechanism (not shown) the switch key 139', when in the "start" position, is pushed inwardly to engage the contact 139 and such inward movement can be effected only in the "start" position. Inasmuch as the clam shell members 18 and 19 are or have been actuated to their neutral position and the engine 11 has been started, the final operation of the switch mechanism is to place it in the "run" position. This is effected by a further turn of the switch key to the "run" position where the battery contact 137 and the coil contact 138 are connected and also the battery contact 137 is at the same time connected to a contact 141 from which extends a lead 142 to the position selector 132.

The position selector 132 is carried by a suitable supporting panel 132a and has a manually shiftable operating arm 133 provided with a hand knob 134. By shifting the knob forwardly to the forward position or rearwardly to the reverse position, proper circuits are established for actuating the electric motor 64 in a proper direction for shifting the piston 52 and accordingly the clam shell members 18 and 19 to the desired position. Similarly when in neutral position, which is intermediate between the "forward" and "reverse" positions the desired circuits are established for shifting or positioning the piston 52 by operation of the electric motor 64 in such position that the clam shell members 18 and 19 will be in the neutral position such as shown in Figure 8.

As shown, a lamp bulb 145 is positioned within the position selector housing 132 so as to be visible through a suitable lens (not shown) in the wall thereof. The lamp is suitably grounded at 146 and is connected by a lead 147 to the relay 68. The arrangement is such that whenever the motor 64 is energized, the lamp 145 will be lighted to serve as a visual indicator to the operator. It thus serves as a warning signal also because in the event that it is constantly lighted, indication would thus be given that the system is not operating properly.

It is to be understood that numerous changes in details of construction, arrangement and operation may be effected without departing from the spirit of the invention, especially as defined in the appended claims.

What I claim is:

1. In a marine craft, direction control device mounted on said craft in combination with a driving propeller comprising a pair of claim shell members restrained from up and down movement and pivotally connected at the top and bottom for relative lateral rocking movements to and from a closed position, each clam shell member having imperforate arcuate top, bottom and side walls, a propeller in juxtaposed relation to the open front end of said members and occupying the upper portion thereof and leaving a substantial space between the lower end of the propeller and the lower end of the clam shell members to enable, when the clam shell members are in closed position, the propeller to create a stream rearwardly and thence downwardly and forwardly for effecting a reverse or rearward drive.

2. In a marine craft, a combined rudder and reverse control device comprising relatively movable clam shell members mounted on common vertical axes, an arm individual to each clam shell member for rocking same relatively to the other a pivotal support mounted on said craft an elongate frame bar pivotally mounted on said pivotal support, a linear motor on said frame bar, operative connections between said linear motor and said arms for conjointly rocking the latter relative to each other from movements of the motor, and means for rocking said frame bar on said pivotal support for rocking said clam shell members together as a unit for steering purposes.

3. In a marine craft, a combined rudder and reverse control device comprising relatively movable clam shell members mounted on common vertical axes, an arm individual to each clam shell member for rocking same relatively to the other, a pivotal support mounted on said craft coaxial with said vertical axes, an elongate frame bar pivotally mounted on said pivotal support about said vertical axes, a hydraulic piston and cylinder assembly on said frame bar, operative connections between the piston and said arms for conjointly rocking the latter relative to each other in response to piston movement, power driven pump means to force liquid into one or the other ends of said cylinder and withdraw liquid from the opposite end thereof, means for automatically trapping liquid in each end of the cylinder upon discontinuance of said pump means to lock the piston in the selected position, and means to rock said frame bar on said pivotal support to vary the angular position of the clam shell members for steering purposes.

4. In a marine craft, a combined rudder and reverse control device mounted on said craft comprising relatively movable clam shell members mounted on common vertical axes, an arm individual to each clam shell member for rocking same relatively to the other, hydraulic piston and cylinder assembly, operative connections between the piston and said arms for conjointly rocking the latter relative to each other in response to piston movement, said connections comprising a cross head guided for movement on said bar, and a yielding link assembly connecting each end of said cross head and each arm, power driven pump means to force liquid into one or the other ends of said cylinder and withdraw liquid from the opposite end thereof, and means for automatically trapping liquid in each end of the cylinder upon discontinuance of said pump means to lock the piston in the selected position.

5. In a marine craft including a propulsion engine and an electric starting circuit therefor, a combined rudder and reverse control device mounted on said craft comprising relatively movable clam shell members mounted on common vertical axes, an arm individual to each clam shell member for rocking same relatively to the other, hydraulic piston and cylinder assembly, operative connections between the piston and said arms for conjointly rocking the latter relative to each other in response to piston movement, power driven pump means to force liquid into one or the other ends of said cylinder and withdraw liquid from the opposite end thereof, a reversible electric motor driving said pump means, a circuit selector for said motor connected to move in response to piston movements and controlling the direction of rotation of the motor, and means connected to said circuit selector and said starting circuit for delivering electric current to the circuit selector in such manner that the latter transmits current to the electric motor for causing operation thereof to actuate the clam shells to their neutral position in the event they are disposed in any position other than neutral upon energization of said starting circuit.

References Cited in the file of this patent
UNITED STATES PATENTS

| | | |
|---|---|---|
| 1,186,210 | Kitchen et al. | June 6, 1916 |
| 1,315,514 | Kitchen | Sept. 9, 1919 |
| 1,371,492 | Kitchen | Mar. 15, 1921 |
| 1,425,887 | Martineau | Aug. 15, 1922 |
| 1,577,919 | McNab | Mar. 23, 1926 |
| 2,200,836 | Didriksen | May 14, 1940 |
| 2,402,724 | Bidwell | June 25, 1946 |
| 2,548,121 | Reid | Apr. 10, 1951 |
| 2,751,752 | Metcalf | June 26, 1956 |

FOREIGN PATENTS

| | | |
|---|---|---|
| 139,671 | Great Britain | Mar. 11, 1920 |